United States Patent
Carroll et al.

(10) Patent No.: US 10,148,541 B2
(45) Date of Patent: Dec. 4, 2018

(54) LOCATION-BASED WEBSITE HOSTING OPTIMIZATION

(71) Applicant: Go Daddy Operating Company, LLC, Scottsdale, AZ (US)

(72) Inventors: James Carroll, Los Gatos, CA (US); Paul Bennett, Fremont, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 15/588,492

(22) Filed: May 5, 2017

(65) Prior Publication Data
US 2017/0244624 A1    Aug. 24, 2017

Related U.S. Application Data

(63) Continuation of application No. 15/136,420, filed on Apr. 22, 2016, now Pat. No. 9,680,723, which is a continuation of application No. 14/254,776, filed on Apr. 16, 2014, now Pat. No. 9,350,792.

(51) Int. Cl.
| | |
|---|---|
| *H04L 29/08* | (2006.01) |
| *G06F 17/30* | (2006.01) |
| *H04L 12/26* | (2006.01) |
| *H04L 29/12* | (2006.01) |
| *G06Q 10/06* | (2012.01) |
| *G06F 15/16* | (2006.01) |

(52) U.S. Cl.
CPC ...... *H04L 43/0876* (2013.01); *G06F 17/3087* (2013.01); *G06Q 10/067* (2013.01); *H04L 61/1511* (2013.01); *H04L 61/2007* (2013.01); *H04L 67/02* (2013.01); *H04L 67/1008* (2013.01); *H04L 67/1021* (2013.01)

(58) Field of Classification Search
USPC .......................... 709/219, 221, 205, 250, 227
See application file for complete search history.

(56) References Cited

U.S. PATENT DOCUMENTS

| | | | | |
|---|---|---|---|---|
| 7,457,877 B1 * | 11/2008 | Shah | ................... | H04L 41/5009 709/224 |
| 8,543,157 B1 * | 9/2013 | Fujisaki | ................. | H04M 1/64 379/142.1 |
| 9,965,133 B1 * | 5/2018 | Lindsey | ................ | G06F 3/0481 |

(Continued)

*Primary Examiner* — Jude Jean Gilles
(74) *Attorney, Agent, or Firm* — Quarles & Brady LLP

(57) ABSTRACT

A hosting provider may host a website at a first hosting location based on initial business information received from a hosting customer, perhaps while the hosting customer created an account. The initial business information may include, as non-limiting examples, whether the business is a local or non-localized business, business addresses and/or registered domain names. A domain name, particularly if it resolves to the website, may be analyzed for incorporated words, spelling, characters and/or top-level domain that may point to, or be more commonly used in, one or more geographical regions. The website may be moved to a second location based on the initial business information combined with subsequently collected business information, such as, as non-limiting examples, updated address information, marketing campaigns aimed at particular locations and/or based on the originating location of traffic to the website.

16 Claims, 7 Drawing Sheets

(56) References Cited

U.S. PATENT DOCUMENTS

| | | | | |
|---|---|---|---|---|
| 2001/0052016 | A1* | 12/2001 | Skene | G06F 9/505 |
| | | | | 709/226 |
| 2005/0027625 | A1* | 2/2005 | Doyle | G06Q 30/04 |
| | | | | 705/34 |
| 2011/0072357 | A1* | 3/2011 | Arnstein | G06F 17/30905 |
| | | | | 715/738 |
| 2011/0107241 | A1* | 5/2011 | Moore | G06F 17/3089 |
| | | | | 715/760 |
| 2011/0213712 | A1* | 9/2011 | Hadar | G06Q 30/04 |
| | | | | 705/80 |
| 2012/0110121 | A1* | 5/2012 | Flitcroft | G06F 17/30899 |
| | | | | 709/217 |
| 2014/0040975 | A1* | 2/2014 | Raleigh | H04W 12/12 |
| | | | | 726/1 |

* cited by examiner

LOCATION-BASED WEBSITE HOSTING OPTIMIZATION

CROSS-REFERENCE TO RELATED APPLICATIONS

This application is a continuation of U.S. patent application Ser. No. 15/136,420 entitles "LOCATION-BASED WEBSITE HOSTING OPTIMIZATION" and filed on Apr. 22, 2016, which is a continuation of U.S. patent application Ser. No. 14/254,776 entitled "METHOD FOR LOCATION-BASED WEBSITE HOSTING OPTIMIZATION" and filed on Apr. 16, 2014.

FIELD OF THE INVENTION

The present invention generally relates to the optimization of hosting arrangements for websites serving traffic originating from a number of different locations based on business information regarding the hosting customer and/or from web traffic flow to the website.

SUMMARY OF THE INVENTION

The present invention provides methods for moving a website from a first location to a second location that may provide faster response times and/or other benefits for Internet users visiting the website. The method may start by collecting at a first time, by one or more hardware servers, a first business information from a hosting customer. The first business information may be received, as a non-limiting example, as part of a customer account creation process.

A first hosting location, in a plurality of hosting locations, may be selected based, at least in part, on the first business information regarding the hosting customer. The website may be hosted for the hosting customer on one or more hosting servers at the first hosting location by a hosting provider.

A second business information may be collected at a second time, by the one or more hardware servers, regarding the hosting customer. As non-limiting examples, the second business information may comprise information received when the hosting customer updates the hosting customer's account (such as by changing the hosting customer's business address) or information received regarding a new marketing campaign aimed at customers that reside closer to the second hosting location than the first hosting location. Additional business information may be collected continuously, periodically (such as daily) or whenever a triggering event occurs (such as the hosting customer updating the hosting customer's account information).

Based, at least in part, on the second business information, a second hosting location may be selected that is different from the first hosting location. The website may either be replicated (the website is in both locations) or moved so as to be hosted on one or more hosting servers at the second hosting location.

In some embodiments, the business information may comprise a domain name registered to the hosting customer. The domain name, particularly if the domain name resolves (points to) the website, may be used to select the first or the second location. Domain name(s) registered to the hosting customer that do not resolve to the website may either be ignored or also analyzed as part of the business information. Domain name(s) that resolve to the website may be analyzed by looking at: 1) the words, 2) the spelling of the words, 3) the characters in the domain name, as well as 4) the top level domain (domain name extension) to determine a language or a geographical region that is consistent with the domain name.

In some embodiments, the business information may comprise a type of business associated with the website. As non-limiting examples, the type of business may refer to whether the business is local, i.e., serves mainly local customers (such as a restaurant, dry cleaner, auto mechanic, etc.) or whether the business is non-localized, i.e., serves customers from any location (such as manufacturers and/or distributors that sell shippable goods/products or websites that offer Software as a Service (SaaS) products). A local business may be weighted to have its hosting location for its website near its place of business. A non-localized business may be weighted to have its hosting location for its website near where most of its web traffic flow originates from, i.e., where most of its customers are located.

In some embodiments, the hosting provider may collect website traffic data to the website to determine where most of the incoming traffic originates. The decision on whether to move a website and, if the website is to be moved, where the new hosting location should be, may be based, at least in part, on the website traffic data to the website. In some embodiments, the first and/or second hosting locations may be determined based on a combination of business information and website traffic data to the website.

The above features and advantages of the present invention will be better understood from the following detailed description taken in conjunction with the accompanying drawings.

DETAILED DESCRIPTION

Figure 1:
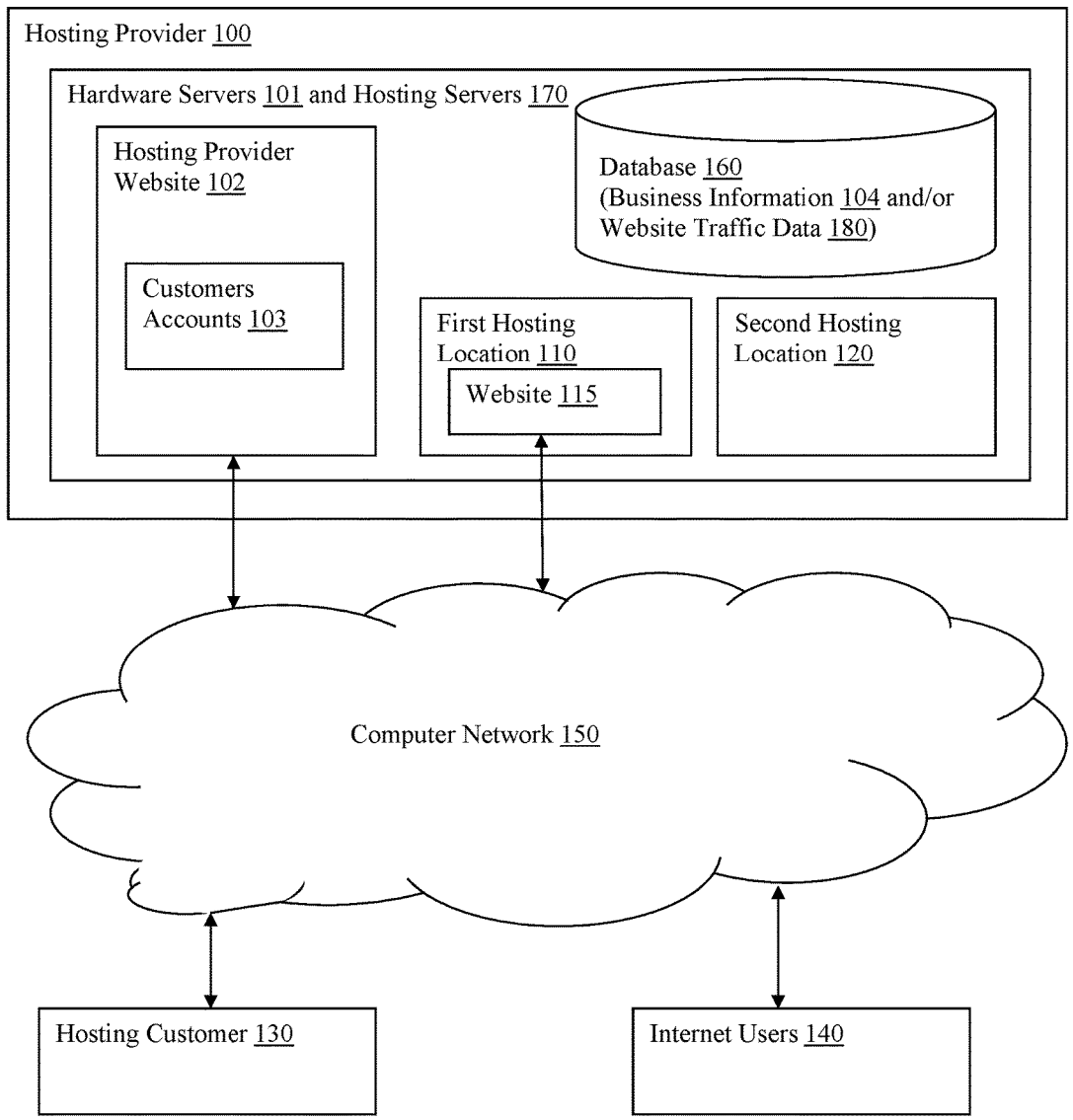
FIG. 1 is a block diagram of a system that illustrates a website at a first location for practicing the present invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to practice the present invention. A computer network 150 may be a collection of links and nodes (e.g., multiple computers and/or other devices connected together) arranged so that data may be passed from one part of the computer network 150 to another part of the computer network 150. The computer network 150 may span the entire world and allow communication from any point in the world to any other point in the world where the computer network 150 exists. Examples of computer networks 150 include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between websites 115 on hardware servers 101 and Internet users 140 on client computers. Hundreds of millions of people around the world have access to client computers connected to the Internet via Internet Service Providers (ISPs).

Content providers may place multimedia information (e.g., text, graphics, audio, video, animation, and other forms of data) at specific locations on the Internet referred to as websites 115. The combination of all the websites 115 and their corresponding web pages on the Internet is generally known as the World Wide Web (WWW) or simply the Web.

For Internet users 140 and businesses alike, the Internet continues to be increasingly valuable. More people use the Web for everyday tasks, from social networking, shopping, banking, and paying bills to consuming media and entertainment than ever before. E-commerce is growing, with businesses delivering more services and content across the Internet, communicating and collaborating online, and inventing new ways to connect with each other.

Prevalent on the Internet are multimedia websites 115, some of which may offer and sell goods and services to individuals and organizations. Websites 115 may consist of a single webpage, but typically consist of multiple interconnected and related web pages. Websites 115, unless very large and complex or have unusual traffic demands, typically reside on a single hardware server 101 and are prepared and maintained by a single individual or entity (although websites 115 residing on multiple hardware servers 101 is certainly possible and even necessary in some cases). Menus, links, tabs, etc. on the website 115 may be used to move between different web pages within the website 115 or to move to an entirely different website.

Websites 102, 115 may be created using HyperText Markup Language (HTML) to generate a standard set of tags that define how the web pages for the websites 102, 115 are to be displayed. Internet users 140 may access content providers' (such as businesses) websites 102, 115 using software known as an Internet browser, such as MICROSOFT INTERNET EXPLORER, MOZILLA FIREFOX, or GOOGLE CHROME. After the browser has located the desired webpage, the browser requests and receives information from the webpage, typically in the form of an HTML document, and then displays the webpage content for the Internet user 140 on the client computer using the browser. The Internet user 140 may then view other web pages at the same website 102, 115 or move to an entirely different website using the browser.

Some hosting customers 130, typically those that are larger and more sophisticated, may provide their own hardware server(s) 101, software, and connections to the Internet. But many hosting customers 130 either do not have the resources available or do not want to create and maintain the infrastructure necessary to host their own websites 115. To assist such individuals (or entities), hosting providers 100 exist that offer website hosting services on one or more hardware servers 101 and hosting servers 170. These hosting providers 100 typically provide the hosting servers 170, software, and electronic communications necessary to connect multiple websites 115 to a network 150, such as the Internet. A single hosting provider may literally host thousands of websites 115 on one or more hosting servers 170.

Browsers are able to locate specific websites 115 because each website 115, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. The browser is able to access a website 115 on the Internet through the use of a URL. The URL may include a Hypertext Transfer Protocol (HTTP) request combined with the website's 115 Internet address, also known as the website's 115 domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the Registry is also the authoritative source for contact information related to the domain name and is referred to as a "thick" Registry. For other TLDs (e.g., .com and .net) only the domain name, registrar identification, and name server information is stored within the Registry, and a Registrar is the authoritative source for the contact information related to the domain name. Such Registries are referred to as "thin" registries. Most gTLDs are organized through a central domain name Shared Registration System (SRS) based on their TLD.

Domain names may comprise one or more words which may be from a particular language or used more commonly in a particular geographical region. The spelling of the word(s) and/or characters used in the domain name may also point to a particular language or geographic region. The top-level domain (TLD or domain name extension), particularly if it is a country code top-level domain (ccTLD), may also be used to determine a particular language or geographical region consistent with the domain name.

The Internet user 140 may use a client computer, such as, as non-limiting examples, a cell phone, PDA, tablet, laptop computer, or desktop computer to access a website 115 via a computer network 150, such as the Internet.

The website 115 may have one or more web pages and be hosted or operated from one or more hosting servers 170. Any type of hosting server 170, now known or later developed, may be used to practice the invention. The hardware servers 101 and hosting servers 170 may include, as a non-limiting example, one or more Dell PowerEdge(s) rack server(s), IBM blade server(s), Intel tower server(s) and/or Cisco server(s), although other types of hardware servers 101 and hosting servers 170, combinations of one or more hardware servers 101 and hosting servers 170, server software and applications may also be used to practice the invention.

A database 160, run on the hardware servers 101 and stored on a storage medium, may also be used to practice the invention. The database 160 may store one or more databases and/or files. A database 160 is an organized collection of data. The data are typically organized to model relevant aspects of reality in a way that supports processes requiring this information. Database management systems (DBMSs) are specially designed applications that interact with the database 160 to capture and analyze data. A general-purpose database management system (DBMS) is a software system designed to allow the definition, creation, querying, updating, and administration of databases. As non-limiting examples, DBMSs may include MySQL, MariaDB, PostgreSQL, SQLite, Microsoft SQL Server, Oracle, SAP, dBASE, FoxPro, IBM DB2, LibreOffice Base and FileMaker Pro.

Any type of database 160 on the one or more hardware servers 101 may be used to practice the current invention, but the database 160 is preferably able to store at least business information 104 for one or more hosting customers 130 and website traffic data 180.

A hosting customer 130 may create a customer account 103 that will comprise business information 104, stored in the database 160, regarding the hosting customer 130 and/or the business of the hosting customer 130. Each hosting customer 130 preferably has his/her own customer account 103 and stored business information 104. In addition, the system may gather business information 104 regarding the hosting customer 130 by searching the computer network 150 for available public and private records. FIG. 1 is a block diagram of a system that illustrates the website 115 of the hosting customer 130 at a first location 110.

The business information collected and analyzed by the present system and method may include any information associated with the customer and/or the customer's business that may be useful in identifying one or more optimal or preferred locations for hosting the customer's website 115. In one implementation, relatively basic information, such as the customer's physical location (e.g., as determined by geolocation techniques based upon the customer's IP address or by an analysis of a location of a mobile device of the customer) or the customer's home or business mailing address may be used to determine a suitable hosting location—in such a case it may be desirable to provide hosting from a location as close to the customer's location as possible. This may be particularly true if the customer's business tends to serve local customers (e.g., the customer's business provides local services or products). Similar information that may also be analyzed include a preferred language and/or selected locale for the user, which may all be useful in assisting in the determination of a location of a particular customer and/or the customer's business. Such language and/or locale preferences may be selected by the user as part of an account configuration process, or otherwise entered via a suitable user information modification interface.

In such a case, by providing hosting services that are located nearby the customer and, consequentially, the customer's own customers, visitors to the website 115 are more likely to see good performance when accessing website 115 than if website 115 were to be hosting in a remote geographical location.

Sometimes, in addition to the customer's own location, the business information that is used to determine an optimized hosting location for the website 115 will be derived via an analysis of the traffic visiting the customer's website 115. For example, even if the customer is located in a first location, the customer's business may see a large number of customers in a second location. For example, a company selling novelty cactus in Phoenix, Ariz. may not have many customers in Arizona. Instead, the business may have a large number of customers in the mid west or in another country. For such a business, the traffic visiting the company's website will originate from the geographical location in which the company's customers are also located.

In that case, it may be possible to analyze traffic flow to the website 115 to determine an optimized hosting location that is well suited to serving content in response to the majority of traffic to website 115. In the present example, therefore, even though the customer is located in Phoenix, the optimized hosting location may, in fact, be somewhere in the mid west, where the hosting servers are in geographical proximity to a majority of the potential customers visiting the web site 115. One algorithm for determining such an optimized hosting location includes determining the geographical location from which a number of website 115 visits originated. These locations can be determined using any suitable approach—in one method an IP address from which a visit originated can be translated into an address or GPS coordinates identifying a particular location. Having identified the locations associated with a number of website visits, a geographic center of those locations can be calculated. Having calculated the geographic center, it is possible to identify an available hosting location that is closest to that geographical center. That hosting location may then be designated as an optimized hosting location for the website 115. In some implementations, the geographical center can be weighted based upon a number of different factors including weighting the center towards the origination site of website traffic that generates the most revenue, weighting the center towards the origination site of website traffic that occurs during business hours, and the like.

Unfortunately, when the location of hosting services is based on traffic that has already visited the website, the selected location tends to not be forward looking. Because it takes time to analyze existing website 115 traffic and then, once an updated optimized hosting location is identified, it takes time to move the website content to a new hosting location, it can take some time to respond to new website traffic from a new market to perform the described optimizations.

In order to provide forward-looking analysis of a customer's company and to make predictions regarding the optimized hosting locations for future website traffic, the business information can include additional types and categories of data. For example, the business information may include data describing the customer's ongoing advertising and marketing efforts. These may be entered into the business information manually, or can be inferred based upon the customer's activities. For example, the customer may purchase some advertising services from hosting provider 100 to promote the customer's website in a particular region (e.g., South America). In that case, because the customer may see a large increase in website 115 traffic from the target region, the creation of such a marketing campaign may indicate that an optimized hosting location for website 115 may be in that particular region. That way, as the marketing campaign begins to have effect, new customers visiting the website 115 from that region will experience good performance while browsing the website 115.

In situations where hosting provider 100 has access to accounting records associated with the customer's business, the business information may include product shipment and invoice records, making it possible to identify the location of a number of the business' customers. In that case, the location of the customers themselves can be used to identify an optimized hosting location for the website 115.

The business information 104 and web traffic data 180 may be collected on a per website basis, so that all data associated with the website 115 can be combined together and analyzed as a whole. In other implementations, however, the business information 104 and web traffic data 180, or at least portions thereof, can be collected on a per webpage basis. This allows, for example, the web traffic to be analyzed separately for different web pages belonging to website 115. This can be useful because different web pages of website 115 may be popular in different regions.

For example, the various web pages may be rendered in different languages, meaning that the web pages tend be accessed by individuals residing in different countries. Additionally, if the different web pages depict different products, some products depicted on one webpage may be popular in a first location, region or country, while different products depicted on different web pages may be popular in different locations, regions, and countries.

Having identified an optimized hosting location for the website 115, hosting provider 100 can take any suitable action. This may involve, for example, automatically moving the entire contents of the website 115 from first hosting location 110 to the second hosting location 120. This may be done automatically, without any input from the customer, or only with the customer's consent.

When the customer first creates a customer account 10 with hosting provider 100, the hosting provider 100 may provider the customer with an option to select a desired hosting location for the customer's website 115. At this time, the hosting provider 100 can analyze all information provided by the customer in order to make a determination of an optimized hosting location for the customer. At this time, the analysis may be focused primarily on the contents of the customer's account 103 because the customer's website 115 will not have seen much traffic.

Figure 2A:
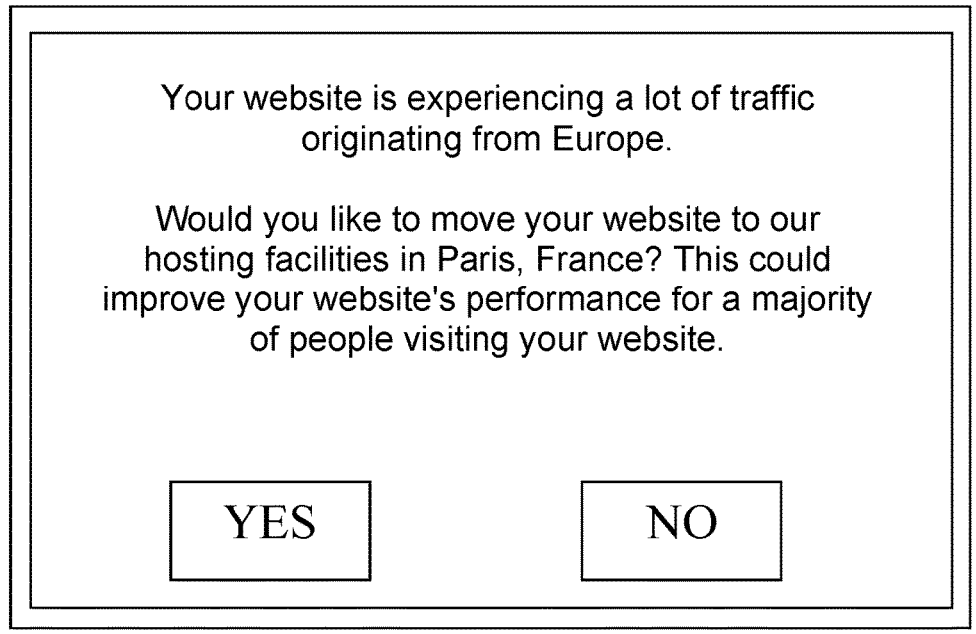
FIGS. 2A-2B are screenshot illustrating example user interface of the present disclosure.

After the customer has selected an initial hosting location for the website 115, however, the hosting provider 100 may continually analyze the business information 104 and website traffic data 180 associated with the website 115 to determine optimized hosting locations. If, in performing this analysis, the hosting provider 100 identifies a new optimized location for the website 115, the hosting provider 100 can notify the customer of the same. The customer can then be provided with an option to host their website 115 on a server at or near the optimized hosting location. To illustrate, FIG. 2A shows a user interface that may be displayed for a customer by hosting provider 100, when hosting provider 100 has determined that, due to an analysis of traffic visiting website 115 that a second hosting location may be optimal for the website 115. The user is presented with an option to move the website to hosting facilities in the optimized location.

Figure 2B:
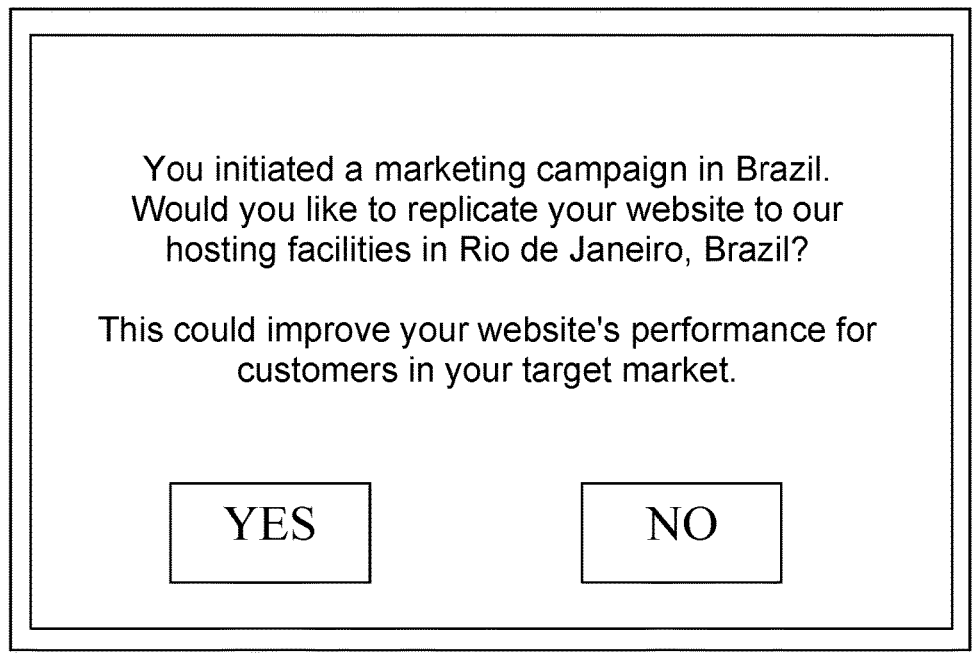

When making a recommendation regarding a new optimized hosting location, the customer may be given the option of moving their website 115 entirely to the new optimized hosting location. In that case, once the move is complete, the website 115 would only be served from the new hosting location and would no longer reside in the original location. Alternatively, the customer may be given the option of replicating the website 115 at the new location. When replicated, the website 115 is copied to, rather than moved to, the new optimized hosting location. The determination of whether to move or replicate the website 115 or portions of the website 115 may involve the hosting provider 100 making an automated analysis of the website 115. The analysis may determine the type of the website 115 and then making recommendations based upon that type. For example, if the website 115 is that of a business serving a local community, the website 115 may be moved entirely to the optimized hosting location. A website 115, however, that serve a more dispersed audience (e.g., an audience at least partially located within the original hosting location) may be replicated to the optimized hosting location. The recommendation to either move or replicate website 115 may include other recommendations pertaining to the use of content delivery networks (CDNs) and other content delivery services. After replication, the website 115 will be hosted at both the original hosting location, as well as the new optimized hosting location. FIG. 2B, as illustration, shows an example screenshot in which a user is presented with an option to replicate website 115 in a new location based upon an analysis of an upcoming marketing campaign.

The hosting provider 100 may, in some cases, make a recommendation to move or replicate only portions of the customer's website 115 to the new optimized hosting location. For example, if the hosting provider's 100 analysis indicates that a particular subset of the web pages making up website 115 should be hosted in the new optimized hosting location, the customer may be given an option of move or replicate only those pages. Alternatively, upon identifying the new optimized hosting location, the hosting provider 100 may automatically move or replicate the subset of web pages as necessary. For example, only those portions of the website 115 that are static may be moved or replicated to the optimized hosting location. In that case, portions of the website 115 (e.g., non-static web pages) that rely upon databases or other external systems that may be nearby the original hosting location may not be moved or replicated to the optimized hosting location.

In some cases, in addition to making recommendations regarding whether to move or replicate content to the new optimized hosting location, the hosting provider 100 can, after having analyzed the business information 104 and website traffic data 180, make recommendations regarding technological modifications to website 115 that, potentially in combination with hosting the content at the optimized hosting location, may improve the performance of the website 115. For example, following the analysis, hosting provider 100 may recommend that certain of the web pages making up the website 115 be converted from dynamic pages into static pages. Similarly, recommendations regarding the best encodings for multimedia (e.g., image and/or video encodings) can be provided by the hosting provider 100. In one embodiment, an analysis of page load time from various customers' locations can be utilized to determine which web pages of website 115 should be converted to static content or otherwise modified to improve website 115 performance.

The recommendations provided by the hosting provider may be for permanent or only temporary changes to website 115. For example, if the hosting provider 100 determines that a spike in traffic from a particular region is only temporary, the recommendation to host all or a portion of the website 115 in that region may include a temporal limitation. For example, the hosting provider 100 may suggest that the website 115 be hosted (e.g., via moving or replication of the website 115) in the optimized hosting location for a period of time, such as a week or a month. For example, access to the website 115 may be increased by temporarily moving or replicating all or part of the website 115 for the duration of a particular event (e.g., sporting event, political event, news event) and moving the website 115 back to the original hosting location upon the conclusion of the event (or following a predetermined time period following the event). The conclusion of the event may be predictable—in the case of a sporting event, the conclusion may be a known time and date. In some cases, though, the conclusion of the event is difficult to predict. In that case, the conclusion of the event may need to be determined manually, or via an automated system (e.g., it may be possible to determine the conclusion of a dramatic news event by automatically monitoring news headlines for particular keywords that indicate the news event has concluded). In some embodiments, the website 115 may be temporarily moved or replicated to other hosting locations in a cyclical fashion (e.g., based upon seasons or holidays that routinely result in anomalous traffic patterns to the website 115). For example, an analysis of the historical traffic patterns to a particular website 115 may indicate that, even though the website's primary customers are located in a first region, during a particular seasonal event or reoccurring time period there is a large traffic surge from a second region. Based upon that analysis, the hosting provider 100 may recommend that the website 115 be moved or replicated to a hosting location nearby or within the second region during that season or reoccurring time period.

Figure 3:
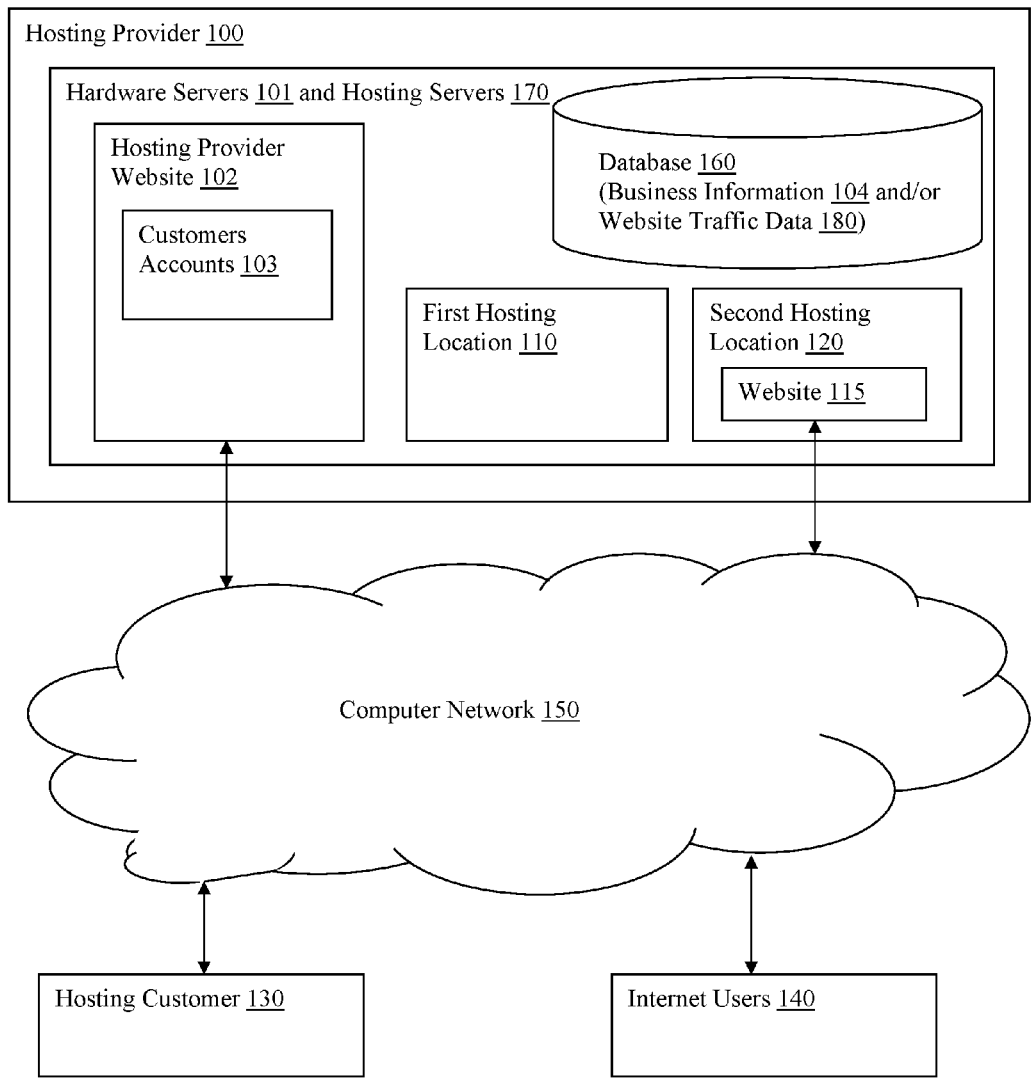
FIG. 3 is a block diagram of the system that illustrates the website at a second location for practicing the invention.

The present invention, therefore, provides methods for optimizing the hosting arrangement for a customer's website 115 that may involve moving the hosting location of the website 115 from the first location 110 to a second location 120 (shown in FIG. 3). By adjusting the hosting location of the website, the server hosting the website may provide faster response times and/or other benefits for Internet users 140 visiting the website 115. Creating an efficient and friendly user experience is desirable as an Internet user 140 is more likely to purchase goods and/or servers from a fast, friendly and highly responsive website 115.

In some embodiments, the hosting provider 100, the first hosting location 110, and the second hosting location 120 are operated by the same entity. For example, the first hosting location 110 and the second hosting location 120 may be different facilities in different locations that are managed and operated by the same hosting provider 100. In other embodiments, however, one or more of the hosting provider 100, the first hosting location 110, and the second hosting location 120 can be operated by separate entities. For example, the hosting provider 100 may be operated by a first entity, while the first hosting location 110 and the second hosting location 120 are operated by a second entity. In that case, the hosting provider 100 may provide a service accessible to the second entity (e.g., via an API) that the second entity may utilize to determine which one of its available hosting locations is an optimized hosting location. In some cases, each of the hosting provider 100, the first hosting location 110, and the second hosting location 120 are operated by different entities.

Figure 4:
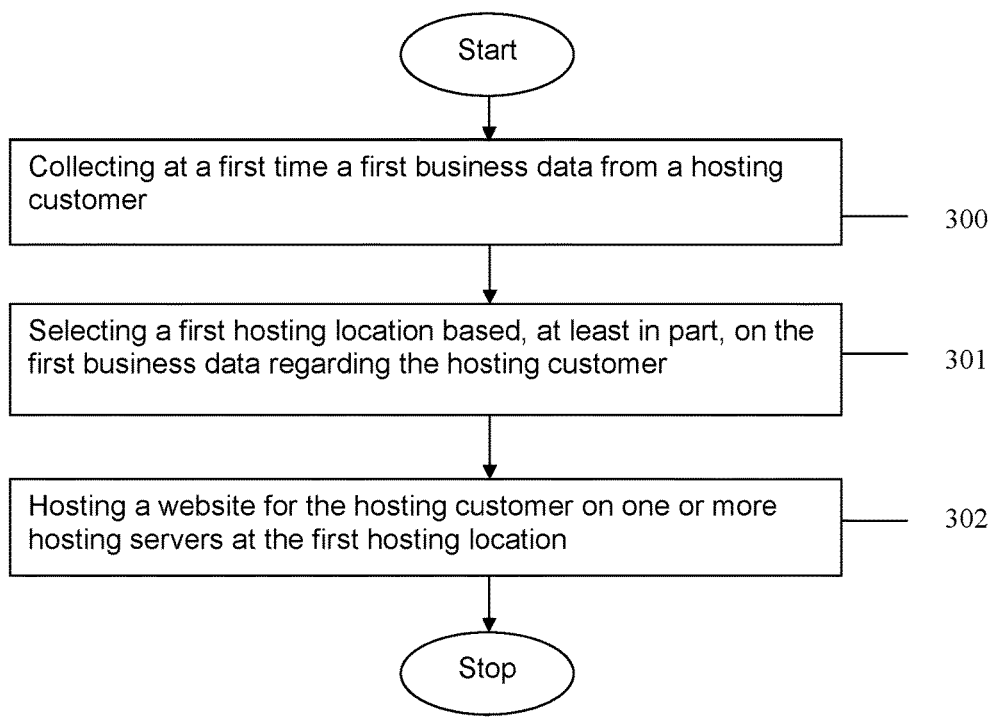
FIGS. 4-7 are flow diagrams of example methods for practicing the invention.

FIG. 4 illustrates a method for practicing the invention. The method may start by collecting at a first time, by one or more hardware servers 101, a first business information 104 from a hosting customer 130. (Step 300) The first business information 104 may be collected, as a non-limiting example, as part of a customer account 103 creation process. The first business information 104 may be stored in a database 160. In some implementations, the business information 104 may be generated over time as a by product of the day-to-day operations of the website 115 and the customer's business.

The hosting provider 100 preferably has one or more hosting servers 170 at a plurality of geographically separated hosting locations 110, 120. While any number of hosting locations 110, 120 and hosting servers 170 may be used, in general, the more hosting locations 110, 120 and the more geographically separated the hosting locations 110, 120, the better.

A first hosting location 110, in the plurality of hosting locations 110, 120, may be selected based, at least in part, on the first business information 104 (stored in the database 160) regarding the hosting customer 130. (Step 301) The website 115 may be hosted for the hosting customer 130 on one or more hosting servers 170 at the first hosting location 110. (Step 302)

As discussed above, once of the first hosting location 110 is identified, the customer's 130 website may be hosted at that location automatically. In other implementations, however, the customer 130 may be provided a choice of a number of hosting locations, where the first hosting location 110 is identified as a potentially optimized hosting location for the customer's website 115.

Figure 5:
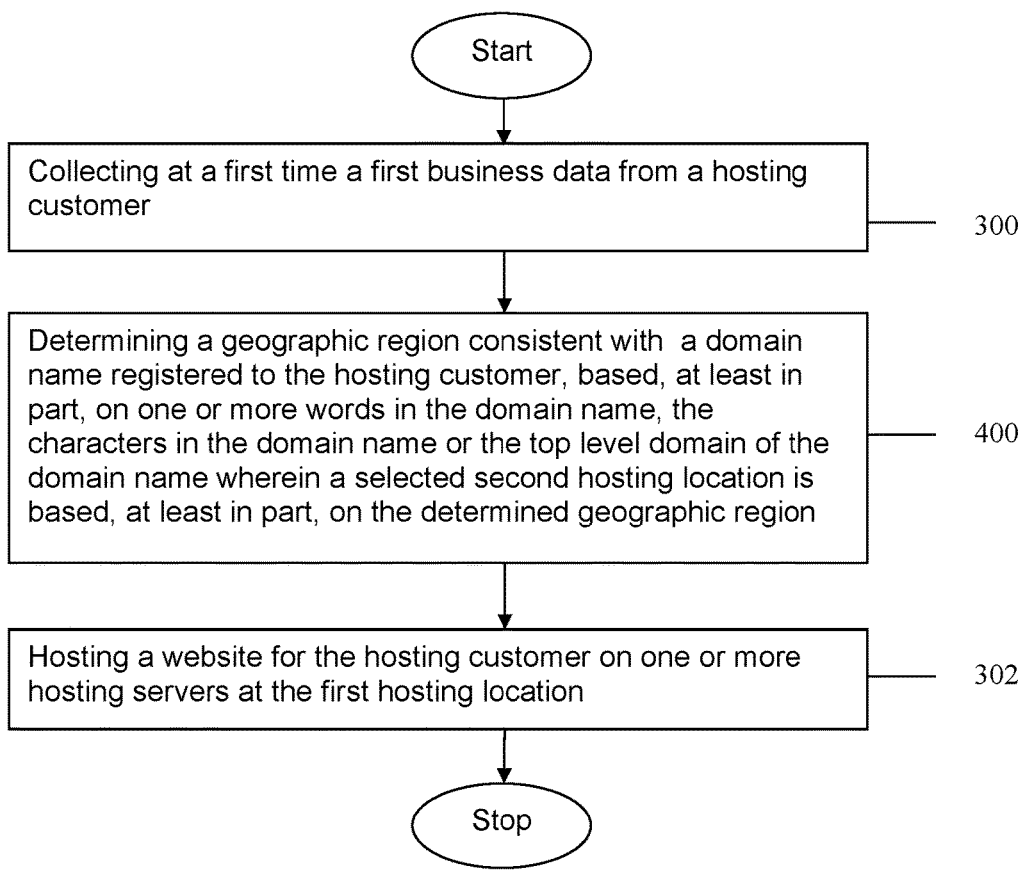

FIG. 5 illustrates another method for practicing the invention. In this embodiment, one or more domain names registered to the hosting customer 130 and preferably resolving or pointing to the hosting customer's 130 website 115 may be analyzed. The domain name(s) may be parsed into one or more words that may be from one or more languages and/or used more commonly in one or more geographical regions. Further, the spelling of the words and characters in the domain name may all be used to determine a language, and thus possibly a geographic region, that is consistent with the domain name. In addition, the top-level domain (TLD or domain name extension) may also be analyzed as certain top-level domains (and certainly country code top-level domains (ccTLD)) are more commonly used in some countries (or geographic regions) than in other countries (or geographic regions). All of these factors may be used to select a hosting location 110, 120 for the website 115. (Step 400)

Figure 6:
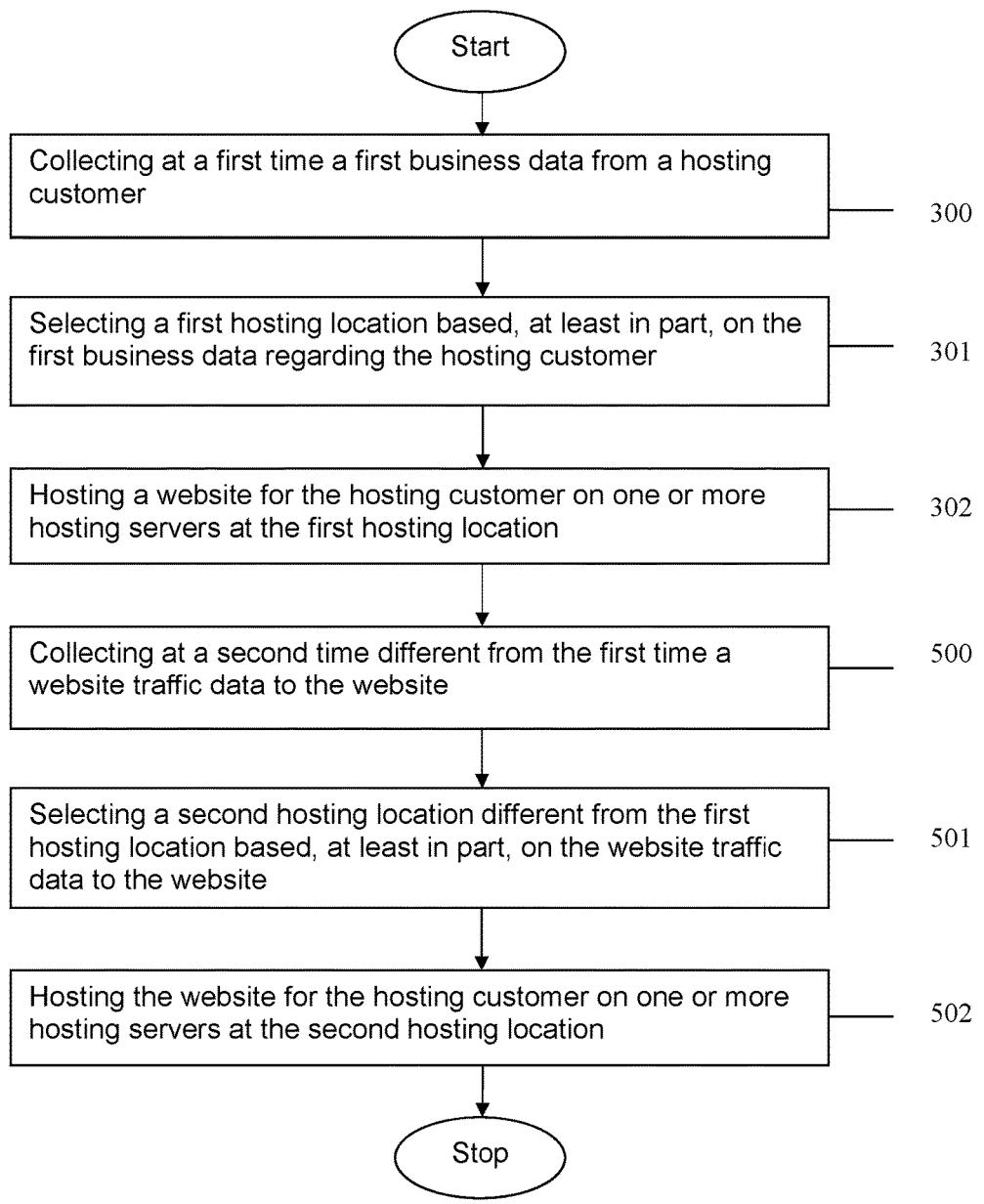

FIG. 6 illustrates additional steps that may be performed with the embodiment illustrated in FIG. 4. In this embodiment, a second business information 104 may be collected at a second time, by the one or more hardware servers 101, regarding the hosting customer 130. (Step 500) As examples, the second business information 104 may comprise information received when the hosting customer 130 updated the hosting customer's 130 account, such as by changing the hosting customer's 130 business address or information received regarding a new marketing campaign aimed at customers (Internet users 140) that reside closer to the second hosting location 120 than the first hosting location 110. Additional business information 104 may be collected continuously, periodically (such as daily) or whenever a trigger event occurs (such as the hosting customer 130 updating the hosting customer's account 103 information) or making a sale to a particular locale. The business information 104 may be stored in a database 160. All of these factors may be used to select a hosting location 110, 120 for the website 115.

Based, at least in part, on the second business information 104, a second hosting location 120 may be selected that is different from the first hosting location 110. (Step 501) The website 115 may either be replicated (left in two or more hosting locations 110, 120) or moved so as to be hosted on one or more hosting servers 170 at the second hosting location 120 as shown in FIG. 3. (Step 502)

In some embodiments, the business information 104 may comprise a domain name registered to the hosting customer 130. The domain name, particularly if the domain name resolves (points to) the website 115, may be used to select a hosting location 110, 120 out of a plurality of hosting locations. Domain name(s) registered to the hosting customer 130 that do not resolve to the website 115 may either be ignored or also analyzed as part of the business information 104. Domain name(s) that resolves to the website 115 may be analyzed by looking at the words, spelling of the words and/or the characters in the domain name as well as the top level domain (domain name extension) to determine a language or geographical region that is consistent with the domain name.

In some embodiments, the business information 104 may comprise a type of business associated with the website 115. The type of business may refer to whether the business is local, i.e., serves mainly local customers, such as a restaurant, dry cleaner, auto mechanic, etc. or whether the business is non-localized, i.e., serves customers from many locations, such as manufacturers and/or distributors that sell shippable goods/products or websites that offer Software as a Service (SaaS) products. A local business may be weighted to have its hosting location 110, 120 for its website 115 near its place of business. In contrast, a non-localized business may be weighted to have its hosting location 110, 120 for its website 115 near where most of its web traffic flow originates from, i.e., where most of its customers (Internet users 140) are located.

Figure 7:
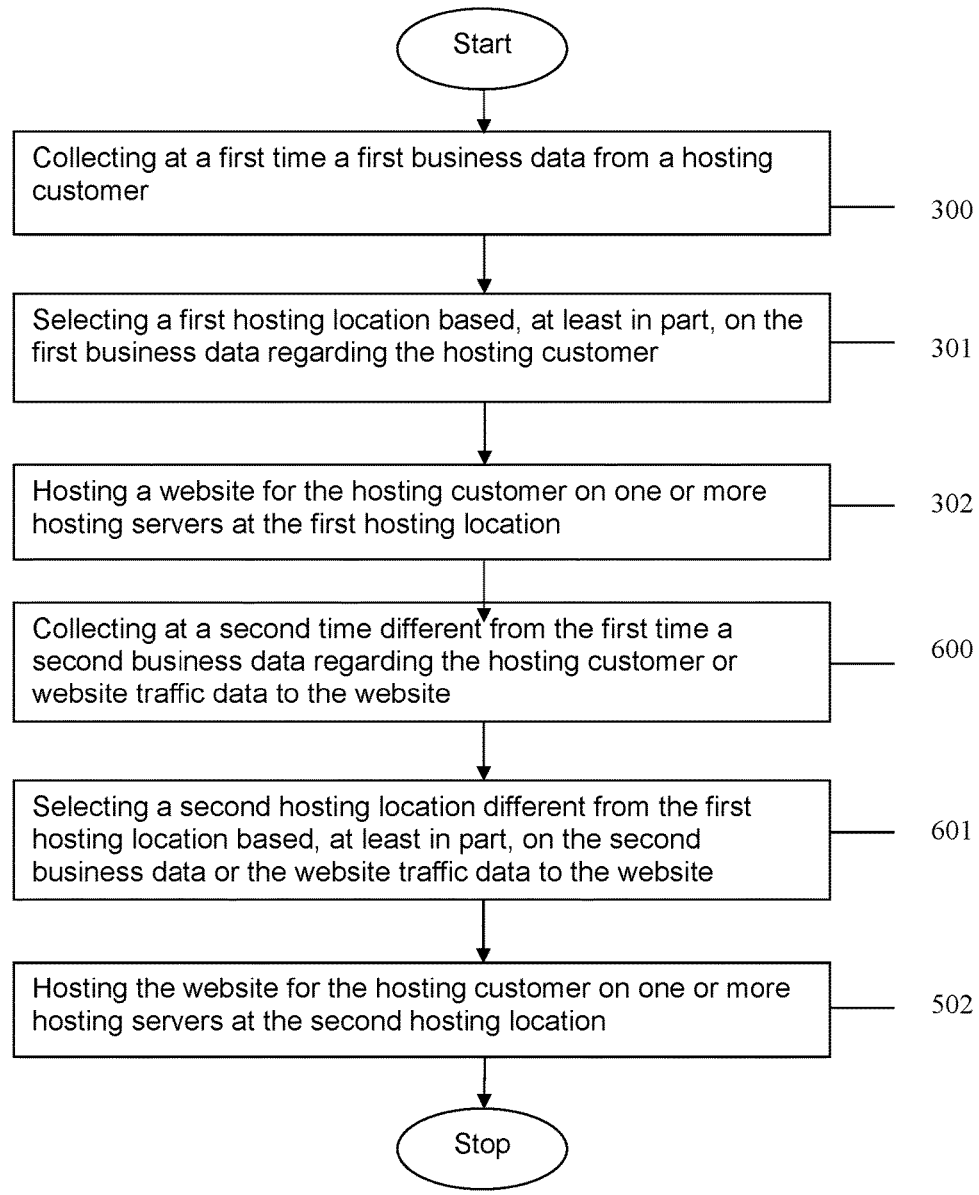

FIG. 7 illustrates another embodiment of the invention. In this embodiment, the hosting provider 100 may collect website traffic data 180 to the website 115 to determine where most of the incoming traffic originates from and/or a second business information 104. (Step 600) The decision on whether to move the website 115 and, if the website 115 is to be move, where the new hosting location 110, 120 should be, may be based, at least in part, on the website traffic data 180 to the website 115. In some embodiments, the first and/or second hosting locations 110, 120 may be determined based on a combination of business information 104 and website traffic data 180 to the website 115. (Step 601)

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A method, comprising:
   identifying, by a hardware server, a first hosting location from a plurality of hosting locations based, at least in part, on source locations of network traffic accessing a website, by:
      identifying global positioning system coordinates for each of a plurality of Internet Protocol (IP) addresses associated with the network traffic accessing the website,
      identifying a geographic center of the global positioning system coordinates, and
      determining the first hosting location is a closest hosting location in the plurality of hosting locations to the geographic center; and
   transmitting, by the hardware server, a user interface to a user recommending that at least a portion of the website be transferred to the first hosting location for hosting at the first hosting location.

2. The method of claim 1, including:
   receiving, by the hardware server and through the user interface, a message encoding an approval or a selection of the first hosting location in the first hosting location; and
   transmitting, by the hardware server, at least a portion of the website to a second hardware server located in first hosting location.

3. The method of claim 1, wherein:
   the user interface includes a user selectable option to either move or replicate the at least a portion of the website to the first hosting location.

4. The method of claim 1, wherein identifying the first hosting location is based, at least in part, on information received when a hosting customer updated a customer account.

5. The method of claim 1, wherein identifying the first hosting location is based, at least in part, on information received when a hosting customer changed a business address in a customer account.

6. A method, comprising:
   determining, by a hardware server, a first hosting location from a plurality of hosting locations based, at least in part, on a first business information in a customer record, by:
      determining the first business information identifies a business mailing address,
      identifying a geographic location of the business mailing address, and
      determining the first hosting location is a closest hosting location in the plurality of hosting locations to the geographic location; and
   hosting at least a portion of a content of a website associated with the customer record on one or more hosting servers at the first hosting location.

7. The method of claim 6, including:
   determining a second hosting location different from the first hosting location based, at least in part, on second business information in the customer record; and
   hosting the at least a portion of the content of the website on a second one or more hosting servers at the second hosting location.

8. The method of claim 7, wherein the second hosting location is based, at least in part, on information received when a hosting customer updated the customer record.

9. The method of claim 7, wherein the second hosting location is based, at least in part, on information received when a hosting customer changed a business address in the second business information.

10. The method of claim 7, wherein the second business information identifies a location of a plurality of customers of a business of a hosting customer.

11. The method of claim 7, wherein the second hosting location is based, at least in part, on a new marketing campaign for a hosting customer aimed at a plurality of customers that reside closer to the second hosting location than the first hosting location.

12. The method of claim 6, wherein first hosting location is based, at least in part, on a top level domain of a domain name registered by a hosting customer.

13. A system, comprising:
   a server computer including a processor configured to perform the steps of:
      identifying, by a hardware server, a first hosting location from a plurality of hosting locations based, at least in part, on source locations of network traffic accessing a website, by:
      identifying global positioning system coordinates for each of a plurality of Internet Protocol (IP) addresses associated with the network traffic accessing the website,
      identifying a geographic center of the global positioning system coordinates, and
      determining the first hosting location is a closest hosting location in the plurality of hosting locations to the geographic center; and
      transmitting, by the hardware server, a user interface to a user recommending that at least a portion of the website be transferred to the first hosting location.

14. The system of claim 13, wherein the processor is configured to perform the steps of:

receiving, by the hardware server and through the user interface, a message encoding an approval or a selection of the first hosting location in the first hosting location; and transmitting, by the hardware server, at least a portion of the website to a second hardware server located in first hosting location.

15. The system of claim 13, wherein:

the user interface includes a user selectable option to either move or replicate the at least a portion of the website to the first hosting location.

16. The system of claim 13, wherein identifying the first hosting location is based, at least in part, on information received when a hosting customer updated a customer account.

* * * * *